US012717451B2

(12) United States Patent
Tsai

(10) Patent No.: US 12,717,451 B2
(45) Date of Patent: Aug. 25, 2026

(54) MACHINE LEARNING FRAME FILTERING

(71) Applicant: STMicroelectronics International N.V., Geneva (CH)

(72) Inventor: Ta-Jung Tsai, Taoyuan City (TW)

(73) Assignee: STMicroelectronics International N.V., Geneva (CH)

( * ) Notice: Subject to any disclaimer, the term of this patent is extended or adjusted under 35 U.S.C. 154(b) by 823 days.

(21) Appl. No.: 18/158,932

(22) Filed: Jan. 24, 2023

(65) Prior Publication Data

US 2024/0248570 A1 Jul. 25, 2024

(51) Int. Cl.
*G06F 17/18* (2006.01)
*G06F 3/044* (2006.01)

(52) U.S. Cl.
CPC ............ *G06F 3/0446* (2019.05); *G06F 17/18* (2013.01)

(58) Field of Classification Search
CPC .......... G06F 3/0446; G06F 3/044; G06F 3/01; G06F 3/00; G06F 17/18; G06F 17/10; G06F 17/00; G06F 3/04166; G06F 3/0416; G06F 3/041; G06F 3/03
See application file for complete search history.

(56) References Cited

U.S. PATENT DOCUMENTS 8,300,019 B2 10/2012 Elias et al.
8,970,537 B1 * 3/2015 Shepelev .......... G06F 3/041662 345/173
9,201,556 B2 12/2015 Free et al.
9,256,321 B2 2/2016 Wang et al.
9,904,412 B2 2/2018 Stevenson et al.
10,007,383 B2 6/2018 Chang et al.
10,261,685 B2 4/2019 Deselaers et al.
11,287,926 B1 3/2022 Shahsavari et al.
11,481,070 B1 10/2022 Ganjali et al.
2003/0132922 A1 * 7/2003 Philipp ................ G06F 3/0444 345/173
2007/0220077 A1 * 9/2007 Miller .................... H03H 17/04 708/300
2009/0289908 A1 11/2009 Chen et al.
2013/0222290 A1 * 8/2013 Choi .................. G06F 3/04184 345/173
2013/0249831 A1 * 9/2013 Harris ..................... G06F 3/016 345/173

(Continued)

OTHER PUBLICATIONS

Wikipedia, "Machine Learning." https://en.wikipedia.org/wiki/Machine_learning, downloaded Nov. 3, 2022, 31 pages.

(Continued)

*Primary Examiner* — Mohamed Charioui
(74) *Attorney, Agent, or Firm* — Slater Matsil, LLP

(57) ABSTRACT

According to an embodiment, a regression analysis is performed on a subset of a dataset, where the subset of the dataset corresponds to inputs from a first row of a matrix of sensors at a time instant k. The regression analysis generates a set of coefficients. A filter transform, to be applied on the subset of the dataset, is determined based on a comparison between the set of coefficients and threshold values. The filter transform can be one of an infinite impulse response (IIR) filter transform, a first-order filter transform, or a second-order filter transform. Once the filter transform is determined, it is applied to the subset of the dataset to generate a first output matrix.

20 Claims, 3 Drawing Sheets

(56) References Cited

U.S. PATENT DOCUMENTS

| | | | | |
|---|---|---|---|---|
| 2014/0062949 | A1 | 3/2014 | Chang et al. | |
| 2015/0346903 | A1 | 12/2015 | O'Connor | |
| 2016/0216794 | A1* | 7/2016 | Yoon | G06F 3/04166 |
| 2017/0116545 | A1 | 4/2017 | Johnson et al. | |
| 2019/0034031 | A1* | 1/2019 | Liu | G06F 3/04182 |
| 2019/0109581 | A1* | 4/2019 | Khalifi | H03H 21/0043 |
| 2021/0072876 | A1 | 3/2021 | Nomura | |

OTHER PUBLICATIONS

Wikipedia, "Regression Analysis." https://en.wikipedia.org/wiki/Regression_analysis, downloaded Nov. 3, 2022, 12 pages.

Nam, Hyoungsik et al., "Review of Capacitive Touchscreen Technologies: Overview, Research Trends, and Machine Learning Approaches," Sensors 2021, 21, 4776, https://www.mdpi.com/journal/sensors, Jul. 13, 2021, 26 pages.

* cited by examiner

MACHINE LEARNING FRAME FILTERING

TECHNICAL FIELD

The present disclosure generally relates to signal processing and, in particular embodiments, to the processing of data captured by a sensor.

BACKGROUND

Touch screens are commonly used as an interface mechanism for electronic devices, such as tablets, smartphones, and computers. Touch screens combine a display to provide outputs with a touch panel to capture inputs. A common type of touch screen is a capacitive touch screen.

A capacitive touch screen uses the electrical properties of the human body and an array of capacitive sensors to detect where and when a user touches the screen. A device fitted with a capacitive touch screen typically includes a sensing grid of capacitive inputs positioned underneath a display panel made of a layer of glass or other transparent material. The sensing grid is typically arranged in a matrix with rows and columns.

When a user touches (e.g., using a finger, capacitive pen, or the like) the capacitive touch screen, the user's finger or hand, for example, acts as a conductor, and a small charge is drawn to the point of contact, which results in a change in capacitance. A controller, coupled to the array of capacitive inputs, detects the change in capacitance by recognizing, for example, a change in the current or voltage at the contact point. The controller determines the location of the touch and executes an appropriate action. For example, if the touch is a swipe or tap, the controller may signal an operating system to open an app or pause a video.

A system, method, device, and circuit that can increase process reliability and minimize errors in detecting an input while adapting to changes in touch screen manufacturing is desirable.

SUMMARY

Technical advantages are generally achieved by embodiments of this disclosure which describe the processing of data captured by a sensor.

A first aspect relates to a method for determining a filter transform. The method includes performing a regression analysis on a subset of a dataset corresponding to inputs from a first row of a matrix of sensors at a time instant k. The regression analysis generates a set of coefficients. The method further includes determining a filter transform to be applied on the subset of the dataset based on a comparison between the set of coefficients and threshold values. The filter transform is one of an infinite impulse response (IIR) filter transform, a first-order filter transform, or a second-order filter transform. Once the type of filter transform is determined, it is applied to the subset of the dataset to generate a first output matrix.

In a first implementation form of the method according to the first aspect as such, the method further includes applying the IIR filter transform on the subset of the dataset in response to not detecting an interaction with any sensor in the first row of the matrix of sensors.

In a second implementation form of the method according to the first aspect as such, or any preceding implementation form of the first aspect, the method further includes receiving raw input data from the matrix of sensors at the time instant k and generating the subset of the dataset by computing a difference between a baseline measurement and the raw input data. The baseline measurement includes an average measurement of the raw input data from the matrix of sensors over multiple time instances at which there is no interaction any sensors in the matrix of sensors.

In a third implementation form of the method according to the first aspect as such, or any preceding implementation form of the first aspect, the baseline measurement is a value stored in a memory. The method further includes retrieving the baseline measurement from the memory.

In a fourth implementation form of the method according to the first aspect as such, or any preceding implementation form of the first aspect, the threshold values are determined using machine learning by determining a range of values for the set of coefficients in accordance with a variety of models associated with interactions with the matrix of sensors.

In a fifth implementation form of the method according to the first aspect as such, or any preceding implementation form of the first aspect, the method further includes repeating the steps of performing, determining, and applying for each row of the matrix of sensors at the time instant k to generate a plurality of output matrices, generating an updated output matrix from the plurality of output matrices, and determining an interaction with the matrix of sensors based on the updated output matrix.

In a sixth implementation form of the method according to the first aspect as such, or any preceding implementation form of the first aspect, the matrix of sensors are sensors of a capacitive touch screen. The method further includes determining touch detection or tracking based on the updated output matrix.

A second aspect relates to a device having a grid sensor with a matrix of sensors having n rows and m columns, a non-transitory memory storage having instructions, and a processor in communication with the non-transitory memory storage and the grid sensor. The instructions, when executed by the processor, cause the processor to receive a set of input data corresponding to inputs from the matrix of sensors at a time instant k, perform a regression analysis on the set of input data corresponding to inputs from a first row of the matrix of sensors at the time instant k—the regression analysis generating a set of coefficients, apply an infinite impulse response (IIR) filter transform, a first-order filter transform, or a second-order filter transform on the set of input data based on a comparison between the set of coefficients and threshold values, and generate a first output matrix for the set of input data based on the applied filter transform.

In a first implementation form of the device according to the second aspect as such, the instructions, when executed by the processor, cause the processor to apply the IIR filter transform on the set of input data corresponding to inputs from the first row of the matrix of sensors at a time instant k in response to not detecting an interaction with the matrix of sensors corresponding to the first row.

In a second implementation form of the device according to the second aspect as such, or any preceding implementation form of the second aspect, the instructions, when executed by the processor, cause the processor to receive raw input data from the matrix of sensors at the time instant k and generate the set of input data by computing a difference between a baseline measurement and the raw input data. The baseline measurement being an average measurement of the raw input data from the matrix of sensors over multiple time instances at which there is no interaction with the grid sensor.

In a third implementation form of the device according to the second aspect as such, or any preceding implementation form of the second aspect, the baseline measurement is a value stored in the non-transitory memory storage. When executed by the processor, the instructions cause the processor to retrieve the baseline measurement from the non-transitory memory storage.

In a fourth implementation form of the device according to the second aspect as such, or any preceding implementation form of the second aspect, the threshold values are determined using machine learning by determining a range of values for the set of coefficients in accordance with a variety of models associated with interactions with the grid sensor.

In a fifth implementation form of the device according to the second aspect as such, or any preceding implementation form of the second aspect, the instructions, when executed by the processor, cause the processor to repeat the steps of performing and applying for inputs from all rows of the matrix of sensors at the time instant k to generate a plurality of output matrices, generate an updated output matrix having n rows and m columns from the plurality of output matrices; and determine an interaction with the grid sensor based on the updated output matrix.

In a sixth implementation form of the device according to the second aspect as such, or any preceding implementation form of the second aspect, the grid sensor is a sensor of a capacitive touch screen. The instructions, when executed by the processor, cause the processor to determine a user interaction with the capacitive touch screen.

A first aspect relates to a method for processing input data from a grid sensor having a matrix of sensors with n rows and m columns. The method includes receiving a set of input data corresponding to inputs from the matrix of sensors at a time instant k and performing a third-degree polynomial regression on the set of input data corresponding to inputs from a first row of the matrix of sensors at the time instant k. The third-degree polynomial regression generates a first, a second, a third, and a fourth coefficient. The method further includes applying an infinite impulse response (IIR) filter transform, a first-order filter transform, or a second-order filter transform on the set of input data based on a comparison between the second and fourth coefficients and the three threshold values and generating a first output matrix for the set of input data based on the applied filter transform.

In a first implementation form of the method according to the third aspect as such, the method further includes applying the IIR filter transform in response to the fourth coefficient being below a first threshold and the second coefficient being less a second threshold.

In a second implementation form of the method according to the third aspect as such, or any preceding implementation form of the third aspect, the method further includes applying the first-order filter transform in response to the fourth coefficient being less than a first threshold and the second coefficient being greater than a second threshold.

In a third implementation form of the method according to the third aspect as such, or any preceding implementation form of the third aspect, the method further includes applying the second-order filter transform in response to the fourth coefficient being less than a first threshold and the second coefficient being greater than a third threshold or the fourth coefficient being greater than the first threshold.

In a fourth implementation form of the method according to the third aspect as such, or any preceding implementation form of the third aspect, the method further includes applying the IIR filter transform on the set of input data corresponding to inputs from a first row of the matrix of sensors at a time instant k in response to determining a no interaction with sensors corresponding to the first row.

In a fifth implementation form of the method according to the third aspect as such, or any preceding implementation form of the third aspect, the method further includes repeating steps of performing and applying for inputs from all rows of the matrix of sensors at the time instant k to generate a plurality of output matrices, generating an updated output matrix having n rows and m columns from the plurality of output matrices, and determining an interaction with the grid sensor based on the updated output matrix.

Embodiments can be implemented in hardware, software, or in any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
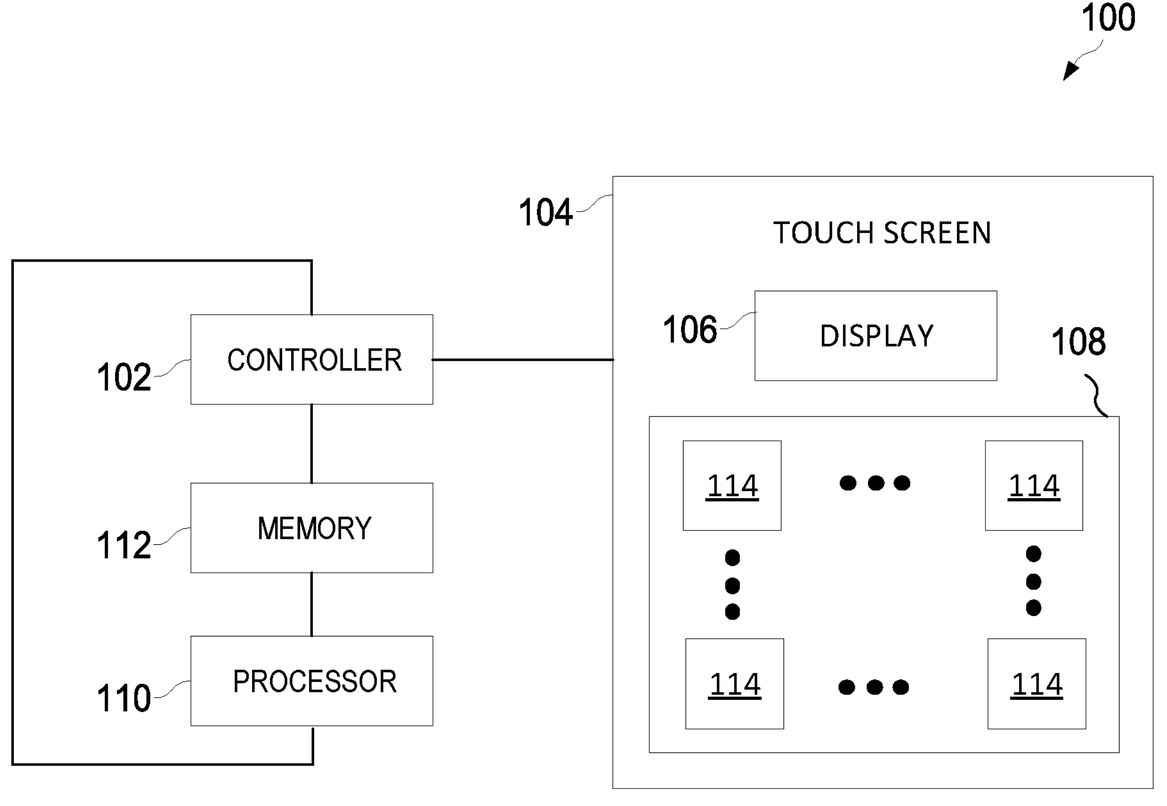
FIG. 1 is a schematic diagram of an embodiment device.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a capacitive touch screen, it should also be appreciated that these inventive aspects may also apply to the processing of other types of sensor inputs. In particular, aspects of this disclosure may similarly apply to any grid-type sensor used in, for example, image recognition or object detection. Generally, a grid-type sensor is a type of sensor that is arranged in a matrix or grid pattern. The grid pattern allows the sensor to sense a greater range of inputs over a large input area. Further, the specific technology that embodiments of this disclosure apply to is not limited to a capacitive sensor. For example, a grid-type sensor based on optical, acoustic, or electromagnetic principles may also, advantageously implement the embodiments disclosed.

In embodiments, a method and device are provided to process input data collected from a grid sensor having a matrix of sensors with n rows and m columns. Generally, the input data collected can be represented as a matrix of data with an associated time component (e.g., frames).

Aspects of the disclosure include the performing of a regression analysis on the set of input data corresponding to inputs from the first row of the matrix of sensors at the time instant k. The regression analysis is used to generate a set of coefficients. In embodiments, the absolute values of the coefficients are then compared to threshold values to determine which filter transform should be applied to the dataset.

In embodiments, the filter transform is one of an infinite impulse response (IIR) filter transform, a first-order filter transform, or a second-order filter transform. A first output matrix is generated for the set of input data based on the applied filter transform. The process is repeated for all rows of the dataset for time instant k to generate a complete output matrix for all sensors of the grid sensor for the frame under analysis. The output matrix is then used to determine the location of, for example, a touch or execution of an action. In embodiments, multiple output matrices over a period may be used to determine the location of, for example, a touch or execution of an action.

In embodiments, in response to determining a no interaction (e.g., no touch), the IIR filter transform is applied to the set of input data corresponding to inputs from the first row of the matrix of sensors at a time instant k without applying the regression analysis (i.e., the regression analysis is skipped in response to detecting a no interaction with the cells of the corresponding row), which advantageously speeds up the processing and reduces computation time and resources.

In some embodiments, the raw input data are subtracted from a baseline measurement to remove noise, for example, a repetitive type of noise on the input data. In embodiments, the baseline measurement is routinely refreshed, for example, during a startup or a non-interaction period between the user and the device. In embodiments, the baseline measurement is an average measurement of the raw input data from the matrix of sensors over multiple time instances at which there is no interaction with the grid sensor. In embodiments, the multiple-time instances are consecutive. In some embodiments, the baseline measurements are stored in a memory storage of the device and are retrieved and subtracted from the raw input data before further analysis by a device controller.

Various embodiments of this disclosure use machine learning, for example, to determine values used during the analysis. For example, in embodiments, threshold values used to determine the filter transform type are determined using machine learning by generating multiple models of interactions or non-interactions with the device. In embodiments, the threshold values are stored in the memory and retrieved by the controller during the analysis.

In embodiments, the regression analysis is a third-degree polynomial regression, which generates a first, a second, a third, and a fourth coefficient. In response to the fourth coefficient being below a first threshold and the second coefficient being less a second threshold, the filter transform applied is the IIR filter transform. In response to the fourth coefficient being less than the first threshold and the second coefficient being greater than the second threshold, the filter transform applied is the first-order filter transform. In response to the fourth coefficient being less than the first threshold and the second coefficient being greater than a third threshold or the fourth coefficient being greater than the first threshold, the filter transform applied is the second-order filter transform. These and other details are discussed in greater detail below.

FIG. 1 illustrates a schematic diagram of embodiment device 100. The device 100 includes a controller 102, a touch screen 104, a memory 112, and a processor 110, which may (or may not) be arranged as shown. In embodiments, the controller 102 and the processor 110 may be implemented as a single processing unit. The device 100 may include additional components not depicted, such as long-term storage (e.g., non-volatile memory, etc.), additional input and output interfaces, speakers, or the like.

In embodiments, device 100 is a smartphone, smartwatch, wearable device, tablet, laptop, or any other device that includes a grid-type sensor, such as a device with a touch screen (e.g., a smart thermostat, a refrigerator, a car infotainment console, or the like).

During normal operation, controller 102 controls the operation of touch screen 104. For example, in some embodiments, controller 102 receives raw input data from the touch screen 104 to determine, for example, the location and the type of touch. Controller 102 may include an analog-to-digital converter (ADC)—not shown—to convert the analog signals from the touch screen 104 to digital signals for further processing by controller 102. In embodiments, the ADC may be external to the controller 102. Controller 102 may be any component or collection of components adapted to perform computations or other processing-related tasks. In embodiments, controller 102 is arranged on a System-on-Chip (SoC). In embodiments, controller 102 may be implemented in any way known in the art.

Memory 112 may be any component or collection of components adapted to store programming or instructions for execution by controller 102. In an embodiment, memory 112 includes a non-transitory computer-readable medium. In some embodiments, memory 112 is part of processor 110. In some embodiments, memory 112 is external to processor 110 (such as inside controller 102). Other implementations are also possible. In some embodiments, memory 112 may also be used for storing other types of data of device 100.

In embodiments, touch screen 104 allows a user to interact/communicate with the device 100. In embodiments, touch screen 104 includes a display 106 and an array of sensors 108 (also referred to as a grid, a touch grid, touch cells, or sensing elements). Display 106 is configured to display images. In embodiments, a panel driver (not shown) may be coupled to the display 106 and the processor 110. The panel driver may be used to drive Display 106. Display 106 may be implemented in any way known in the art.

The array of sensors 108 includes a plurality of sensors 114 arranged in rows and columns. Sensors 114 and the array of sensors 108 may be implemented in any way known in the art. In embodiments, touch screen 104 is a capacitive touch screen.

Processor 110 is configured to operate device 100. In embodiments, processor 110 is implemented as a general-purpose or custom controller or processor coupled to memory 112 and configured to execute instructions from memory 112 or another memory of device 100. In embodiments, processor 110 may be coupled to a second memory of device 100, which stores the instructions to be executed by processor 110. In some embodiments, processor 110 is implemented as part of controller 102. In embodiments, processor 110 is a master processing unit, and controller 102 is a slave processing unit.

Figure 2:
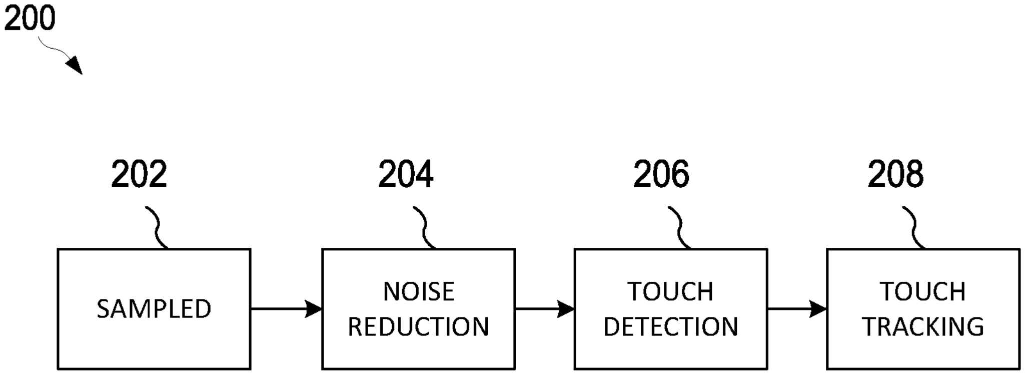
FIG. 2 is a flow chart of an embodiment method for analyzing input data, as may be implemented in the device.

FIG. 2 illustrates a flow chart of an embodiment method 200 for analyzing input data, as may be implemented in device 100. Generally, the raw data from the array of sensors 108 is converted (i.e., pre-processed) to data usable by controller 102 to determine and interpret interaction(s) with device 100 by a user. The conversion of data can include a combination of hardware and software algorithms.

At step 202, the input data is sampled by controller 102 from touch screen 104. The sampling includes capturing, at a high frequency, as much information as possible about the interaction with sensors 114.

At step 204, the sampled data is processed for noise reduction to reduce noise in the input data and to improve the accuracy of, for example, the touch location. Generally, noise reduction is a core step in the preprocessing of input data from an array of sensors 108 because it helps to enhance the accuracy, for example, of touch detection and improve user experience. Noise reduction typically includes low-pass filtering, signal averaging, adaptive filtering, or the like.

Low-pass filtering typically involves passing the input data through a filter to remove high-frequency components from the signal, smooth out the input data, and improve touch accuracy detection. Generally, signal averaging encompasses collecting multiple samples of the input data and averaging them together to lessen the influence of the noise on the final result. Although signal averaging can reduce random noise, it is generally ineffective in removing periodic noise. Adaptive filtering commonly involves using an algorithm and computational resources to identify and remove complex or variable noise by adapting to the input data.

Generally, sensing of the touch screen 104 is not time synchronized with the driving of display 106. A user can be touching the touch screen 104 and the display 106 may be driven at the same time or the user can be touching the touch screen 104 while the display may not be driven. Thus, at times, the raw input data from the array of sensors 108 may include noise from the display 106 driving solution. In embodiments where the touch screen 104 and the display 106 operate at a different frequency or time domain, the effect of the noise from the display 106 driving solution can be minimal; however, the associated noise may still be included in the raw input data.

Another type of noise that may be included in the raw input data is noise color (e.g., grey, zebra with one on and one off, zebra with two on and two off, and the like). Yet another type of noise that may be included in the raw input data is noise from, for example, a charging circuit or a wireless charger. In embodiments, the associated noise in the frequency domain can be dense and intense. In embodiments, the associated noise can be more significant than the noise from the driving solution. Embodiments of this disclosure provide a means to remove or significantly reduce the noise in the raw input data before analysis of, for example, the touch detection (step 206) and touch tracking (step 208).

At step 206, controller 102 processes the filtered data for touch detection to detect the presence of, for example, touch and estimate the location of the touch on the screen. Various algorithms may be used to find the best match by, for example, comparing the input data to a set of pre-defined touch patterns or templates.

At step 208, controller 102 processes the filtered data for touch tracking, such that the location and movement over time are tracked to determine the type of touch, such as a tap, pinch, swipe, or the like. The information is used to initiate by, for example, processor 110 an appropriate response from device 100.

Figure 3:
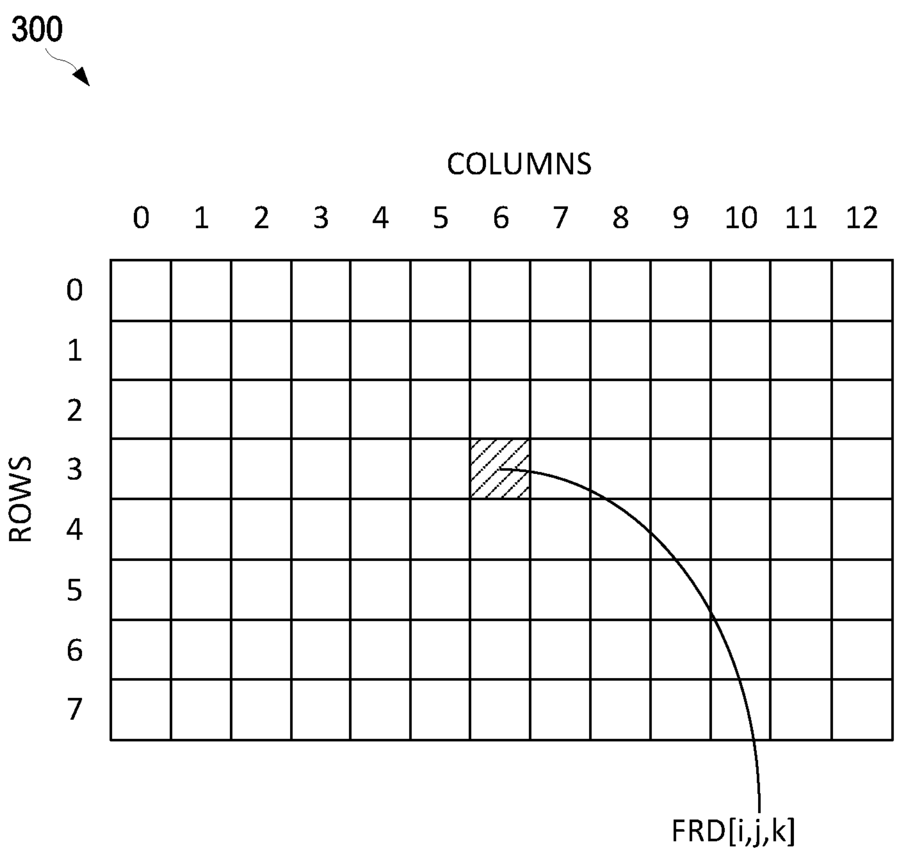
FIG. 3 is a representation of an embodiment raw data frame matrix captured at time k from an array of sensors.

FIG. 3 illustrates a representation of an embodiment raw data frame matrix 300 captured at time k from the array of sensors 108. The raw data frame matrix 300 is shown as an array with 13 columns and 8 rows. However, it is noted that the number of columns and rows is non-limiting, and greater or fewer numbers are similarly contemplated.

A sample data point of the raw data frame matrix 300 is represented as FRD[i,j,k], where i is the row number, j is the column number, and k is the sampling time instant. For example, a sample data point collected at time instant k, from a sensor 114 located at column 5 and row 6 is represented as FRD[6,5,k]. As another example, a sample data point collected at time instant k+1, collected from a sensor 114 located at column 4 and row 2 is represented as FRD[2,4,k+1].

In embodiments, a machine learning filtering technique is provided that lowers the processing time and power consumption of controller 102, while maintaining the filtering performance of noise in a frame dataset (e.g., data corresponding to the array of sensors 108 at instant time k). A machine learning filtering technique is a method used to select a subset of data from a larger dataset for use in a machine learning algorithm. The goal of filtering is to improve the performance of the algorithm by reducing the amount of noise or irrelevant data in the dataset. There are several different filtering techniques, such as feature selection and instance selection, that can be used for this purpose. These techniques can be applied before or during training to help the algorithm learn more effectively from the data. The machine learning filtering technique can be embodied in the firmware of controller 102 or stored as instructions in memory 112 and executable by controller 102.

In embodiments, the machine learning filtering technique is applied during the regression analysis of a linear model to extract coefficients of a respective row of sampling data of a polynomial regression model in real-time.

Generally, machine learning is the study of computer algorithms that can improve automatically through experience and by the use of data. Machine learning algorithms build a model based on a sample data, known as training data, to make predictions or decisions without explicitly programming. In embodiments, the training of threshold values for the analysis is completed offline based on machine learning.

In embodiments, a method of building a regression analysis model from the sampled data is proposed. In embodiments, the regression analysis model is used to determine a property of the sampled data using a high-dimensional polynomial regression model. Generally, regression analysis is a statistical method for studying the relationship between a dependent variable and one or more independent variables. It can be used to predict the dependent variable's value based on the independent variables' values. Regression analysis is primarily used for prediction and forecasting, where its use substantially overlaps the field of machine learning and infers causal relationships between the independent and dependent variables.

In embodiments, relationships between no touch, touch, and noise are predicted and estimated by analyzing the properties of the sampled data. This disclosure's embodiments provide a method to select a specific filtering technique best suited to the data based on the predictions and analysis. This is in contrast to the conventional frame filtering process solutions, which use the same filtering technique or model for all data points across different frames.

Figure 4:
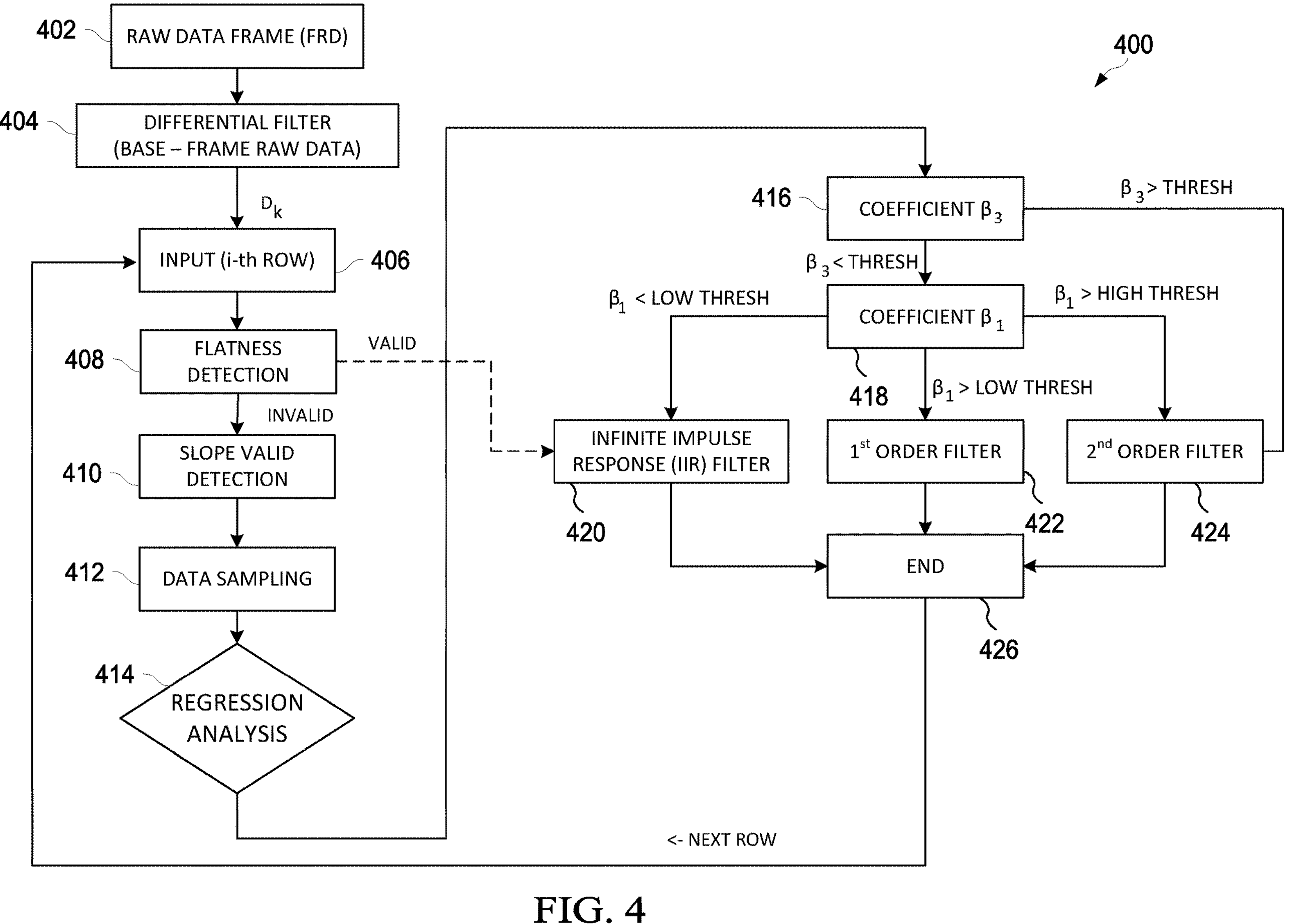
FIG. 4 is a flow chart of an embodiment method for processing raw data from the array of sensors, such as from a capacitive touch screen.

FIG. 4 illustrates a flow chart of an embodiment method 400 for processing raw data from the array of sensors 108, such as from a capacitive touch screen. In embodiments, method 400 is implemented in controller 102 of device 100 or implemented in processor 110.

At step 402, during the sampling phase from step 202, raw input data is sampled by controller 102 from touch screen 104. The raw input data includes a time component, identified herein as time instant k. For example, the raw input data from the array of sensors 108 at a first instant can be represented as $FRD_k$. Likewise, at a second instant immediately subsequent to the first instant, the raw input data from the array of sensors 108 can be represented as $FRD_{k+1}$.

At step 404, a differential filter calculation is applied to the raw input data. The differential filter calculation includes subtracting the raw input data at a specific instant in time from a baseline measurement. In embodiments, the baseline measurement corresponds to an average of raw input data measurements or samples from the array of sensors 108 at different instances in time and where the user is not interacting with the touch screen 104.

In an embodiment, the value of the baseline measurement, based on M number of sampled measurements (i.e., time instances) from the array of sensors 108, is computed using $$\text{Baseline} = \frac{FRD_1 + FRD_2 + \ldots + FRD_M}{M},$$

where M is a positive integer number.

In embodiments, each raw input data is in the form of a matrix. In such embodiments, the baseline measurement value is in the form of a matrix. Thus, each row and column of the raw input data from each sensor 114 is subtracted from the corresponding row and column of the baseline measurement to provide a differentially filtered input data ($D_k$), in the form of a matrix.

In embodiments, the baseline measurement is a single value applied to the raw input data collected from all sensors 114. In embodiments, the baseline measurement is a single value for each column or each row of the array of sensors 108.

In embodiments, the baseline computation represents the normal state of the touch screen 104 (i.e., sensing element, sensor) in the absence of touch. In embodiments, the sampled measurements are consecutive sampling time instants. In embodiments, the baseline computation is a value stored in memory 112. In embodiments, the baseline computation is a measurement performed at the factory, for example, where device 100 or touch screen 104 is built. In embodiments, the baseline computation is a measurement performed at an initial startup of device 100. In embodiments, the baseline computation is a measurement performed before or after a user touches the touch screen 104. In embodiments, the baseline value is refreshed in response to detecting a change, for example, in the environment by one or more sensors (e.g., sensors of device 100 different than the sensors of the touch screen) of the device 100. In each of these embodiments, the measurements to calculate the baseline measurement are collected without touch or an interaction by the user with the device 100 or touch screen 104.

Thus, at step 404, the raw input data goes through an initial noise reduction step to remove the influence of constant noise data from the raw input data, and generate the differentially filtered input data ($D_k$). In embodiments, additional or alternative noise reduction step(s) to step 404 are applied to the raw input data in any way known in the art.

At step 406, once the raw input data goes through an initial noise reduction step at step 404, the differentially filtered input data ($D_k$), corresponding to a particular row, is analyzed from steps 408 through 418 to determine the particular type of filter transform (infinite impulse response (IIR) filtering at step 420, first-order filtering at step 422, or second-order filtering at step 424) is to be applied for that particular row.

At step 408, a flat detection analysis is performed on the differentially filtered input data ($D_k$) for a respective row of the array of sensors 108. The flat detection analysis computes a flatness detection matrix (FD[i,j,k]) having values equal to a difference between an absolute value for each element of the differentially filtered input data ($D_k$) for the particular row with a flatness threshold: FD[i,j,k]=abs(D[i,j,k])−flatness_threshold, where FD[i,j,k] is the flat detection matrix, D[i,j,k] is the differentially filtered input data, and flatness_threshold is the flatness threshold value.

In embodiments, the flatness_threshold has a single value. In embodiments, the flatness_threshold is a matrix. In embodiments, the flatness_threshold is determined by collecting an average of the maximum absolute values of the differentially filtered input data ($D_k$) over several time instances (frames) corresponding to a no touch and known noise effects, such as a test on pure black, pure white, or both type of image screens.

In response to any of the elements of the flat detection matrix (FD[i,j,k]) being greater than zero (i.e., the absolute value of the differentially filtered input data for the particular row being greater than the flatness threshold), the entirety of the respective row is marked as invalid (i.e., the respective row has no flatness) and the method continues at step 410.

If, however, all elements of the flat detection matrix (FD[i,j,k]) are less than zero (i.e., the absolute value of the differentially filtered input data for the particular row is less than the flatness threshold), the entirety of the respective row is marked as valid (i.e., the respective row has flatness) and the method continues at step 420—detailed further below.

A valid flatness determination at step 408 means that there are no touch and no noise effects at the sensors of the row under analysis. Marking the respective row as valid indicates that no interaction is made with any sensor on the row under analysis; thus, the data is less affected by noise. Conversely, marking the respective row as invalid indicates that some interaction is made with at least one sensor on the row under analysis; thus, the data is affected by touch or noise.

In response to making a valid flatness determination at step 408, no regression analysis or sampling of the data is required. It should be noted that other algorithms and comparisons to determine a valid or an invalid determination are also contemplated.

In response to the invalid flatness determination at step 408, at steps 410 and 412, an updated data set (data sampling matrix DS) for the row under analysis is generated by selectively discarding cells of the differentially filtered input data ($D_k$) such that the regression analysis at steps 414, 422, and 424 have a smaller error in the residual sum of squares.

The use of the data sampling matrix DS, instead of the differentially filtered input data ($D_k$), improves the issue of overfitting corresponding to an error in the residual sum of squares (RSS) at steps 414, 422, and $$424\text{−}RSS[i, k] = \sum_{j=0}^{N-1} O[i, j, k]^2,$$

where N is the number of columns. In statistics, the estimation error is a measure of a discrepancy between data and an estimation model, and a small residual sum of squares value indicates a good fit of the model to the data. The use of the data sampling matrix, thus, helps to reduce the residual sum of squares value, which improves the accuracy of the results of coefficients of the model and in fitting the model to the data.

Initially, at step 410, a slope value analysis is performed in response to determining an invalid detection at step 408. The slope value analysis computes an absolute value of the difference between each consecutive sample of the differentially filtered input data ($D_k$) for the respective row. The slope value computation can be represented by the equation: SLP[i,j,k]=abs(D[i,j,k]−D[i,j−1,k]), where SLP[i,j,k] is the slope value computation for the sensor located at column i, row j, at instant time k; where D[i,j,k] is the differentially filtered input data from the sensor located at column i, row j, at instant time k; and where D[i,j−1,k] is the differentially filtered input data from the sensor located at column i, row j−1 (adjacent sensor), at instant time k.

It is understood that, in embodiments, the slope value computation for the first cell of the respective row is not calculated because, other than the second adjacent sensor, there is no other adjacent sensor to the first sensor.

Further, at step 410, once the slope value is computed, the slope value computed for each cell of the respective row is compared against a high-sensitivity response threshold to make a slope valid determination. A valid state indicates an interaction (e.g., touch or noise effect) with a particular sensor of the row under analysis whereas an invalid state indicates a non-interaction (e.g., no touch) with the particular sensor.

An appropriate slug touch at multiple sensors is used in embodiments to determine the high-sensitivity response threshold. In embodiments, the slug touch is a four-millimeter slug touch. In embodiments, the slug touch is at the center of four sensor areas.

At step 412, a data sampling matrix DS, representing the results of the validity check (i.e., D[i,j,k] or "1") for the corresponding sensor in the respective row, is generated—based on the results of the slope validation detection at step 410. The data sampling matrix represents the results of the slope value comparison with the high-sensitivity response threshold, which can be represented as DS[i,j,k]=(SLP[i,j,k]<high sensitivity response threshold)? D[i,j,k]:1. Thus, the value of the data sampling matrix DS[i,j,k] is represented with a "1" where the SLP[i,j,k] has a value greater than the high-sensitivity response threshold at the corresponding column i and row j at time instant k; otherwise, the value of DS[i,j,k] is equal to the value of D[i,j,k].

For example, if the value of SLP[5,2,k] is greater than the high-sensitivity response threshold, the value of DS[5,2,k] is a "1"; otherwise, the value of DS[5,2,k] is equal to "D[5,2,k]".

The data sampling matrix DS is a 1 by j (number of columns) matrix based on the results of the slope validation detection at step 410. The values of the cells of the data sampling matrix DS are subsequently updated by extending a value of "1" to adjacent locations (i.e., DS[i,j−1,k] and DS[i,j+1,k]) where the original DS[i,j,k] value equaled "1".

At step 414, a regression analysis based on, for example, a third-degree polynomial regression model is applied to the updated sampling matrix DS from step 412. A third-degree polynomial regression model is in the form of: $\gamma_j=\beta_0+\beta_1 x_j+\beta_2 x_j^2+\beta_3 x_j^3$, where the time series x={1, 2, . . . , n} is the independent variable of the regression model and is assumed to have n number of data samples. The vector (i.e., unknown parameters of the regression model) of the estimated polynomial regression coefficients using linear least squares estimation is: $\vec{\beta}=(X^T X)^{-1} X^T \vec{\gamma}$. The vector of the third-order polynomial regression coefficients is:

$$\hat{\vec{\beta}} = \left( \begin{bmatrix} 1 & 1 & 1^2 & 1^3 \\ 1 & 2 & 2^2 & 2^3 \\ 1 & 3 & 3^2 & 3^3 \\ \vdots & \vdots & \vdots & \vdots \\ 1 & n & n^2 & n^3 \end{bmatrix}^T \begin{bmatrix} 1 & 1 & 1^2 & 1^3 \\ 1 & 2 & 2^2 & 2^3 \\ 1 & 3 & 3^2 & 3^3 \\ \vdots & \vdots & \vdots & \vdots \\ 1 & n & n^2 & n^3 \end{bmatrix} \right)^{-1} \begin{bmatrix} 1 & 1 & 1^2 & 1^3 \\ 1 & 2 & 2^2 & 2^3 \\ 1 & 3 & 3^2 & 3^3 \\ \vdots & \vdots & \vdots & \vdots \\ 1 & n & n^2 & n^3 \end{bmatrix}^T \vec{y},$$

where $\vec{\gamma}$ corresponds to the updated data sampling matrix of the respective row from step 412.

It is noted that other types of algorithms, such as a K-degree polynomial regression model can be applied, at step 414, to the updated sampling matrix DS from 412. A K-degree polynomial regression model is in the form of:

$$y_j = \sum_{i=0}^{k} \beta_i x_j^i,$$

where the time series x={1, 2, . . . , n} is the independent variable of the regression model and is assumed to have n number of data samples. The vector (i.e., unknown parameters of the regression model) of the estimated polynomial regression coefficients using linear least squares estimation is:

$$\hat{\vec{\beta}} = (X^T X)^{-1} X^T \vec{y}.$$

The vector of the K-order polynomial regression coefficients is:

$$\hat{\vec{\beta}} = \left( \begin{bmatrix} 1 & 1 & 1^2 & \ldots 1^3 \\ 1 & 2 & 2^2 & \ldots 2^3 \\ 1 & 3 & 3^2 & \ldots 3^3 \\ \vdots & \vdots & \vdots & \ddots \vdots \\ 1 & n & n^2 & \ldots n^k \end{bmatrix}^T \begin{bmatrix} 1 & 1 & 1^2 & \ldots 1^k \\ 1 & 2 & 2^2 & \ldots 2^k \\ 1 & 3 & 3^2 & \ldots 3^k \\ \vdots & \vdots & \vdots & \ddots \vdots \\ 1 & n & n^2 & \ldots n^k \end{bmatrix} \right)^{-1} \begin{bmatrix} 1 & 1 & 1^2 & \ldots 1^k \\ 1 & 2 & 2^2 & \ldots 2^k \\ 1 & 3 & 3^2 & \ldots 3^k \\ \vdots & \vdots & \vdots & \ddots \vdots \\ 1 & n & n^2 & \ldots n^k \end{bmatrix}^T \vec{y},$$

where $\vec{\gamma}$ corresponds to the updated data sampling matrix of the respective row from step 412.

Thus, although the embodiments of this disclosure are described in accordance with a third-degree polynomial, it is noted that, for example, higher-order polynomial coefficients can similarly be chosen to achieve better performance. Generally, a higher-order polynomial model can provide a better fit for a dataset as the associated error value of the estimation is reduced as the degree of the polynomial increases. The reduction in the error value improves the noise reduction efficacy. However, as the degree of the polynomial increases, the associated computation time and analytic complexity also increase. Selecting a balance between the degree of the polynomial and process speed is, thus, advantageous.

The results of the estimation (regression analysis) on the updated data sampling matrix of the respective row from step 412 are coefficients (i.e., parameters) $\beta_0$, $\beta_1$, $\beta_2$, and $\beta_3$ of the respective row at the time instant k. In embodiments, the coefficients $\beta_3$ and $\beta_1$ are used to determine the appropriate type of filter transform to be applied to the respective row of the data sampling (DS) matrix under analysis. In embodiments, the absolute value of the coefficients $\beta_3$ and $\beta_1$ are used to determine the appropriate type of filter transform to be applied to the respective row of the data sampling (DS) matrix under analysis. The use of the absolute value of coefficients, in embodiments, can provide better predictive detection for noise cancellation.

In embodiments, threshold values are determined in accordance with machine learning concepts of regression analysis for the purposes of prediction analysis marking different thresholds for touch, no touch, or noisy conditions. Thus, the threshold values are calculated offline while the coefficients for the respective row at time instant k are calculated in real-time. In embodiments, machine learning concepts can be used to determine threshold values in the presence of noise and adaptable to various noise conditions and models.

In embodiments, to determine the threshold values to be compared with the absolute value of the coefficients $\beta_3$ and $\beta_1$, different noise models are used to determine a range of values for the absolute value of the coefficients $\beta_3$ and $\beta_1$. The range of values for the absolute value of the coefficients $\beta_3$ and $\beta_1$ are then used to train data to determine a first threshold, a second threshold, and a third threshold. The first, second, and third thresholds are subsequently compared with the coefficients to determine the type of filter transform, as disclosed further below.

In embodiments, an infinite impulse response (IIR) filtering transform, a first-order filter transform, or a second-order filter transform is applied to the respective row of the data sampling (DS) matrix to generate an output matrix $O_k$ for the respective row based on a comparison between the absolute value of the coefficients $\beta_3$ and $\beta_1$ and the threshold values generated using machine learning.

In embodiments, the determination of the range of values for the absolute value of the coefficients $\beta_3$ and $\beta_1$ and the training of data to determine the first, second, and third thresholds are performed during the engineering/design phase of the manufacturing, and the values are stored in memory 112. In embodiments, the values are updated by, for example, downloading values from the cloud, a website, a server, or the like.

If the absolute value of the coefficient $\beta_3$ is greater than the first threshold, a second-order filter transform is applied to the respective row of the data sampling (DS) matrix to generate a corresponding output matrix ($O_k$) at step 424—further detailed below. However, if the absolute value of the coefficient $\beta_3$ is less than the first threshold, the absolute value of the coefficient $\beta_1$ is instead used to determine the appropriate type of filter transform to be applied.

At step 420, in response to the value of the absolute value of the coefficient $\beta_1$ of the third-order polynomial regression being below the second threshold or a valid flatness detection determination at step 410, at step 420, an infinite impulse response (IIR) filter transform is applied to the respective row of the $$FFD[i,j,k] = (\text{INVALID NODE})?\left(\frac{D[i,j,k]}{div_{threshold}}\right): D[i,j,k],$$

$$\text{where } y[n] = \sum_{k=0}^{M} b_k x(n-k) + \sum_{k=1}^{N} a_k y(n-k),$$

M=0, $a_1$=0, $b_0$=1/div_threshold.

Assuming a simplified IIR filter as $y[n]=b_0x(n)+a_1y(n-1)$, where M=0, N=1, $a_1$=0, $b_0$=1/div_threshold (i.e., $y[n]=b_0x(n)$). The value of div_threshold can be, for example, the values of 2, 4, 8, or 16-depending on the product.

In the case where a valid flatness detection determination is made at step 410, the IIR filter uses the differentially filtered input data ($D_k$) for the row under analysis at step 420 for the filter transform—as shown in the equation above. However, if the process at step 420 results from a determination that the value of the absolute value of the coefficient $\beta_1$ of the third-order polynomial regression is below the second threshold, the filter transform at step 420 uses the updated data sampling (DS) matrix for the row under analysis from step 412 (i.e., replace $D_k$ with DS in the equation above).

Generally, an infinite impulse response filter transform requires minimal processing computations. Thus, it would be advantageous to use a low computation algorithm for data corresponding to, for example, a no-touch condition. A corresponding output matrix ($O_k$) for the respective row is generated from the infinite impulse response filter transform: O[i,j,k]=FFD[i,j,k]. The output matrix indicates the strength of the touch for the sensors associated with the respective row under analysis.

At step 422, in response to the value of the absolute value of the coefficient $\beta_1$ of the third-order polynomial regression being greater than the second threshold, a first-order filter transform is applied to the respective row of the updated data sampling (DS) matrix from step 412: $FFD[i,j,k]=\beta_0+\beta_1\times j$.

In embodiments, the first-order filter transform is a first-order polynomial filter. In embodiments, the first-order filter transform is a first-order linear line filter.

The coefficients of the first-order polynomial filter are generated from the data sampling (DS) matrix of the respective row. The vector of the first-order polynomial regression coefficients being:

$$\hat{\vec{\beta}} = \left(\begin{bmatrix} 1 & 1 \\ 1 & 2 \\ 1 & 3 \\ \vdots & \vdots \\ 1 & n \end{bmatrix}^T \begin{bmatrix} 1 & 1 \\ 1 & 2 \\ 1 & 3 \\ \vdots & \vdots \\ 1 & n \end{bmatrix}\right)^{-1} \begin{bmatrix} 1 & 1 \\ 1 & 2 \\ 1 & 3 \\ \vdots & \vdots \\ 1 & n \end{bmatrix}^T \vec{y},$$

where $\vec{\gamma}$ is data sampling (DS) matrix of the respective row from step 412.

A corresponding output matrix ($O_k$) for the respective row is generated from the first order filter transform: O[i,j,k]=D[i,j,k]−FFD[i,j+1,k].

At step 424, in response to the value of the absolute value of the coefficient $\beta_1$ of the third-order polynomial regression being greater than a third threshold, a second-order filter transform is applied to the respective row of the updated data sampling (DS) matrix from step 412: $FFD[i,j,k]=\beta_0+\beta_1\times j+\beta_2\times j^2$.

In embodiments, the second-order filter transform is a second-order polynomial filter. In embodiments, the second-order filter transform is a second-order curve fit filter. The coefficients of the second-order polynomial filter are generated from the data sampling (DS) matrix of the respective row. The vector of the second-order polynomial regression coefficients being:

$$\hat{\vec{\beta}} = \left( \begin{bmatrix} 1 & 1 & 1^2 \\ 1 & 2 & 2^2 \\ 1 & 3 & 3^2 \\ \vdots & \vdots & \vdots \\ 1 & n & n^2 \end{bmatrix}^T \begin{bmatrix} 1 & 1 & 1^2 \\ 1 & 2 & 2^2 \\ 1 & 3 & 3^2 \\ \vdots & \vdots & \vdots \\ 1 & n & n^2 \end{bmatrix} \right)^{-1} \begin{bmatrix} 1 & 1 & 1^2 \\ 1 & 2 & 2^2 \\ 1 & 3 & 3^2 \\ \vdots & \vdots & \vdots \\ 1 & n & n^2 \end{bmatrix}^T \vec{y},$$

where $\vec{\gamma}$ is data sampling (DS) matrix of the respective row from step 412.

A corresponding output matrix ($O_k$) for the respective row is generated from the second-order filter transform: O[i,j,k]= D[i,j,k]−FFD[i,j+1,k].

At step 426, once the appropriate filter transform is applied to the respective row of the $D_k$ matrix, and a corresponding output matrix $O_k$ is generated for the respective row, steps 408 through 426 are repeated (starting from step 406) for the next row until all rows have been analyzed and a complete output matrix O[i,j,k] is generated.

Once a complete output matrix O[i,j,k] has been generated, it is used, by controller 102, to determine, for example, a corresponding touch detection, as detailed in step 206, a corresponding touch tracking, as detailed in step 208, or a combination thereof, at time instant k.

It is noted that the filter transform is applied spatially regardless of the type of filtering applied. Thus, the only data being filtered to generate the output matrix for the particular row under analysis belong to the same frame (same instant of time).

It is noted that all steps outlined in the flow charts of methods 200 and 400 are not necessarily required and can be optional. Further, changes to the arrangement of the steps, removal of one or more steps and path connections, and addition of steps and path connections are similarly contemplated.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:

performing a regression analysis on a subset of a dataset, the subset of the dataset corresponding to inputs from a first row of a matrix of sensors at a time instant k, the regression analysis generating a set of coefficients;

determining a filter transform to be applied on the subset of the dataset based on a comparison between the set of coefficients and threshold values, the filter transform being one of an infinite impulse response (IIR) filter transform, a first-order filter transform, or a second-order filter transform;

applying the filter transform to the subset of the dataset to generate a first output matrix;

repeating steps of performing, determining, and applying for each row of the matrix of sensors at the time instant k to generate a plurality of output matrices;

generating an updated output matrix from the plurality of output matrices;

determining an interaction with the matrix of sensors based on the updated output matrix; and determining touch detection or touch tracking based on the updated output matrix.

2. The method of claim 1, further comprising applying the IIR filter transform on the subset of the dataset in response to not detecting an interaction with any sensor in the first row of the matrix of sensors.

3. The method of claim 1, further comprising:

receiving raw input data from the matrix of sensors at the time instant k; and generating the subset of the dataset by computing a difference between a baseline measurement and the raw input data, the baseline measurement comprising an average measurement of the raw input data from the matrix of sensors over multiple time instances at which there is no interaction with any sensors in the matrix of sensors.

4. The method of claim 3, wherein the baseline measurement is a value stored in a memory, the method further comprising retrieving the baseline measurement from the memory.

5. The method of claim 1, wherein the threshold values are determined using machine learning, determining of the threshold values comprising determining a range of values for the set of coefficients in accordance with a variety of models associated with interactions with the matrix of sensors.

6. The method of claim 1, wherein the matrix of sensors includes sensors of a capacitive touch screen.

7. A device, comprising:

a grid sensor comprising a matrix of sensors having n rows and m columns;

a non-transitory memory storage comprising instructions; and a processor in communication with the non-transitory memory storage and the grid sensor, wherein the instructions, when executed by the processor, cause the processor to:

receive a set of input data corresponding to inputs from the matrix of sensors at a time instant k;

perform a regression analysis on the set of input data corresponding to inputs from a first row of the matrix of sensors at the time instant k, the regression analysis generating a set of coefficients;

apply an infinite impulse response (IIR) filter transform, a first-order filter transform, or a second-order filter transform on the set of input data based on a comparison between the set of coefficients and threshold values;

generate a first output matrix for the set of input data based on the applied filter transform;

repeat steps of performing and applying for inputs from all rows of the matrix of sensors at the time instant k to generate a plurality of output matrices;

generate an updated output matrix having n rows and m columns from the plurality of output matrices; and determine touch detection or touch tracking based on the updated output matrix.

8. The device of claim 7, wherein the instructions, when executed by the processor, cause the processor to apply the IIR filter transform on the set of input data corresponding to inputs from a first row of the matrix of sensors at a time instant k in response to not detecting an interaction with the matrix of sensors corresponding to the first row.

9. The device of claim 7, wherein the instructions, when executed by the processor, cause the processor to:

receive raw input data from the matrix of sensors at the time instant k; and generate the set of input data by computing a difference between a baseline measurement and the raw input data, the baseline measurement comprising an average measurement of the raw input data from the matrix of sensors over multiple time instances at which there is no interaction with the grid sensor.

10. The device of claim 9, wherein the baseline measurement is a value stored in the non-transitory memory storage, and wherein the instructions, when executed by the processor, cause the processor to retrieve the baseline measurement from the non-transitory memory storage.

11. The device of claim 7, wherein the threshold values are determined using machine learning, wherein determining using machine learning comprises determining a range of values for the set of coefficients in accordance with a variety of models associated with interactions with the grid sensor.

12. The device of claim 7, wherein the grid sensor is a sensor of a capacitive touch screen, and wherein the instructions, when executed by the processor, cause the processor to determine a user interaction with the capacitive touch screen.

13. A method for processing input data from a grid sensor, the grid sensor comprising a matrix of sensors having n rows and m columns, the method comprising:

receiving a set of input data, the set of input data corresponding to inputs from the matrix of sensors at a time instant k;

performing a third-degree polynomial regression on the set of input data corresponding to inputs from a first row of the matrix of sensors at the time instant k, the third-degree polynomial regression generating a first, a second, a third, and a fourth coefficients;

applying an infinite impulse response (IIR) filter transform, a first-order filter transform, or a second-order filter transform on the set of input data based on a comparison between the second and fourth coefficients and three threshold values;

generating a first output matrix for the set of input data based on the applied filter transform;

repeating steps of performing and applying for inputs from all rows of the matrix of sensors at the time instant k to generate a plurality of output matrices;

generating an updated output matrix having n rows and m columns from the plurality of output matrices; and determining touch detection or touch tracking based on the updated output matrix.

14. The method of claim 13, further comprising applying the IIR filter transform in response to the fourth coefficient being below a first threshold and the second coefficient being less a second threshold.

15. The method of claim 13, further comprising applying the first-order filter transform in response to the fourth coefficient being less than a first threshold and the second coefficient being greater than a second threshold.

16. The method of claim 13, further comprising applying the second-order filter transform in response to the fourth coefficient being less than a first threshold and the second coefficient being greater than a third threshold or the fourth coefficient being greater than the first threshold.

17. The method of claim 13, further comprising applying the IIR filter transform on the set of input data corresponding to inputs from a first row of the matrix of sensors at a time instant k in response to determining no interaction with sensors corresponding to the first row.

18. The method of claim 13, wherein the threshold values are determined using machine learning.

19. The method of claim 18, wherein determining of the threshold values comprising determining a range of values for the set of coefficients in accordance with a variety of models associated with interactions with the matrix of sensors.

20. The method of claim 13, wherein the matrix of sensors are sensors of a capacitive touch screen.

* * * * *